United States Patent
Van Den Brink et al.

(10) Patent No.: US 7,957,460 B2
(45) Date of Patent: *Jun. 7, 2011

(54) METHOD OF AND A DEVICE FOR GENERATING A SIGNAL HAVING A PREDETERMINED QUALITY CRITERION FOR USE IN OR ON A COMMUNICATION SYSTEM

(75) Inventors: Robertus Franciscus Maria Van Den Brink, The Hague (NL); Bastiaan Matthijs Van Den Heuvel, Leiden (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/759,894

(22) Filed: Apr. 14, 2010

(65) Prior Publication Data
US 2010/0197240 A1 Aug. 5, 2010

(30) Foreign Application Priority Data

Jul. 7, 2000 (EP) .................................. 00202378
Jan. 8, 2001 (EP) .................................. 01200038

(51) Int. Cl. *H04B 3/46* (2006.01)
(52) U.S. Cl. ..................................... 375/224
(58) Field of Classification Search ............... 375/222, 375/224; 379/3, 22, 29.01
See application file for complete search history.

(56) References Cited

U.S. PATENT DOCUMENTS

| | | | |
|---|---|---|---|
| 4,317,214 A | 2/1982 | Attinello | |
| 6,337,643 B1 | 1/2002 | Gabet et al. | |
| 6,445,733 B1 * | 9/2002 | Zuranski et al. | 375/231 |
| 6,895,053 B1 | 5/2005 | Bailleul | |
| 7,729,417 B2 * | 6/2010 | Van Den Brink et al. | 375/224 |
| 2002/0041637 A1 | 4/2002 | Smart et al. | |
| 2003/0174765 A1 | 9/2003 | Van Den Brink et al. | |

FOREIGN PATENT DOCUMENTS

| | | |
|---|---|---|
| FR | 2783374 | 3/2000 |
| GB | 2031197 | 4/1980 |

OTHER PUBLICATIONS

Rolls, R.G., "Improvements in P.C.M. Regenerator Testing", Marconi instrumentation, vol. 14, No. 2, Aug. 1973, pp. 39-42.

\* cited by examiner

*Primary Examiner* — Khai Tran
(74) *Attorney, Agent, or Firm* — McDonnell Boehnen Hulbert & Berghoff LLP

(57) ABSTRACT

There is disclosed a signal having a predefined quality criterion for use with a communication systems, a method of and a system for generating, such a signal, a method of testing the operation of a communication system using such a signal and a (tele)communication system arranged for operating such a method. The method for generating the signal having a predefined quality the steps of:—representing a first signal (10) comprising a plurality of frequency components each having spectral amplitude and phase properties, and—processing the represented signal by arranging (11) its spectral amplitude properties, and processing the represented signal by arranging (11) its spectral amplitude properties in accordance with the predefined quality criterion.

21 Claims, 7 Drawing Sheets

METHOD OF AND A DEVICE FOR GENERATING A SIGNAL HAVING A PREDETERMINED QUALITY CRITERION FOR USE IN OR ON A COMMUNICATION SYSTEM

CROSS-REFERENCE TO RELATED APPLICATIONS

This is application is a continuation of and claims priority to U.S. patent application Ser. No. 10/311,161 filed Dec. 13, 2002, which is a U.S. National Stage of International Patent Application No. PCT/EP01/07833 filed Jul. 6, 2001, which claims priority to European Patent App. No. EPO 00202378.6 filed Jul. 7, 2000, and to European Patent App. No. EPO 01200038.6 filed Jan. 8, 2001, all of which are incorporated herein by reference.

FIELD OF THE INVENTION

The present invention relates, generally, to communication systems and, more specifically, to a signal for use with a communication system, a method of and a system for generating such a signal, a method of testing the operation of a communication system using such a signal, a test system and a (tele)communication system arranged for operating such a method.

BACKGROUND OF THE INVENTION

Among others, for testing communication systems and communication equipment, such as xDSL transceivers and cables or networks, test signals are needed for stressing the communication system and the communication devices in a manner that is representative to actual deployment scenarios, with large numbers of systems or system devices per cable.

By measuring the transmission performance of the system or system device under realistic (noisy) test conditions, one can improve the design of the system or devices and/or prove that their performance is compliant with standards, such as issued by ETSI, ITU or ANSI or other (tele)communication bodies.

A method of executing such performance tests is to generate a signal which is known as impairment. More specifically, impairment can be subdivided into:

(i) cross-talk noise, having a noise profile characterized by a spectral envelope and spectral amplitude distribution e.g. from neighboring xDSL systems;

(ii) ingress noise, composed of discrete frequency components, also called rfi-tones, having a noise profile characterized by a number of discrete frequency components and spectral amplitude, modulation depth and modulation width parameters originating from radio and amateur broadcasting, for example, and (iii) impulse noise characterized by signal pulses caused by switching operations and components for example.

In the case of ingress noise, the frequency may vary (sweep) in time.

A device for generating impairment is known as an impairment generator and is arranged, in particular for use in or on communication systems, for generating at least one of said cross-talk noise and ingress noise.

In practice, for testing whether communication systems and communication devices are compliant with standards, various noise profiles have been defined which, among others, vary in accordance with system parameters such as the length and number of wire pairs in a communication cable and the transmission data rate, for example.

Further, each different type or length of a transmission medium such as a cable, a copper cable or an optical fiber or other cable type, request a different noise signal.

Methods and devices for generating noise profiles are known in the art. In particular, filtering techniques and filters are known for generating noise from an input signal providing an output signal having a particular spectral envelope and spectral amplitude distribution.

However, by using filtering techniques and filters, a causal relationship is established between the input signal and the output signal. Those skilled in the art will appreciate that such a type of signal is less suitable for a realistic imitation of real operational communication systems and communication devices.

WO 00/16181 discloses a method and a device for generating a random time domain signal approaching a predetermined histogram of amplitudes. In a first step, the signal is created by filtering a noise signal, such as a white noise signal, thereby producing a signal having a predetermined spectral envelope. In a next step, a non-linear function is applied to the filtered noise signal, so as to produce the required time domain signal approaching the predetermined histogram of amplitudes. In a further step, pulse response filtering is applied to the time domain signal, to correct its spectral envelope and to obtain an output signal having a required spectral envelope. Both, the non-linear function and the pulse response filtering function are special functions selected in accordance with the spectral envelope to be provided.

WO 00/16181 is limited in the sense that there is only provided a time domain signal only having a predetermined spectral envelope. WO 00/16181 is silent with respect to other quality criterion's to be imposed on the time domain signal to be provided, among others phase properties.

SUMMARY OF THE INVENTION

It is an object of the present invention to provide an improved signal for use with communication systems and communication devices, in particular for testing such systems and devices in accordance with predefined (standardized) noise profiles.

In a first aspect of the present invention, there is disclosed a method of arranging a signal having a predefined quality criterion, preferably for use in or on a communication system, the method comprising the steps of:

representing a first signal comprising a plurality of frequency components each having spectral amplitude and phase properties, and processing the represented first signal by arranging the spectral amplitude properties in accordance with the or each predefined quality criterion, and arranging random phase properties.

The traditional way of modifying the envelope of a spectrum is the usage of a digital filter bank. This is far from ideal since, for the purpose of the present invention, no causal relationship between the represented first signal and the signal to be provided has to be established. This understanding of matters in accordance with the present invention simplifies the approach of frequency shaping significantly.

Starting from a first signal having random phase properties, frequency shaping of the represented first signal may be an adequate operation to provide a signal meeting the predefined quality criteria, for example. Frequency shaping in accordance with the present invention can be performed in several ways.

In an embodiment of the invention, the first signal is represented by a first set of numbers specifying a spectral amplitude and phase of each frequency component. Scaling of the spectral amplitude of each frequency component suffices to effect frequency shaping of the represented signal in the frequency domain, while maintaining the random phase properties of the signal.

In a further embodiment of the invention, the first signal is represented by a second set of complex numbers having a real part and an imaginary part, which parts in combination specify a spectral amplitude and phase of each frequency component. Frequency shaping is effected by adequately scaling the complex numbers, however such to maintain random phase properties after scaling of the represented first signal.

In a yet further embodiment of the invention, the first signal is represented by a third set of numbers each specifying an amplitude of the first signal in the time domain. By transforming this third set of numbers from the time domain into the frequency domain using, for example, a Fast Fourier Transform (FFT) algorithm, the first signal is represented by a fourth set of numbers specifying a spectral amplitude and phase of each frequency component. This fourth set of numbers can be further processed by a frequency shaping operation, as disclosed above in connection with the first set of numbers.

However, the third set of numbers may also be transformed, in accordance with the invention, from the time domain into the frequency domain for representing the first signal by a fifth set of complex numbers having a real part and an imaginary part. As disclosed above, for the purpose of frequency shaping, the fifth set of complex numbers has to be adequately scaled.

In the case of a represented first signal having non-random phase properties, random phase properties can be approached by properly arranging the second, fourth and fifth set of numbers.

Scaling in the frequency domain can be invoked by multiplication operations, using real or complex scaling factors. The scaling factor for multiplication of the spectral amplitude of a frequency component is found by dividing its desired value by its actual spectral amplitude.

In accordance with a further embodiment of the method according to the invention, in order to achieve a closer match to the or each predefined quality criterion, post-processing of the processed represented first signal is provided.

For use in or on a communications system in accordance with the present invention, however, the represented first signal thus arranged in the frequency domain has to be transformed into the time domain using, for example, an Inverse Fast Fourier Transform (IFFT) algorithm.

Further, the processing steps disclosed above may also a include operations such as convolution or deconvolution or multiplication or add-on of signals. In the time domain, the processed represented first signal meeting the or each predefined quality criterion may be represented among others by a sixth set of numbers in the time domain.

However, with the above approach the signal provided, meeting a quality criterion in the frequency domain, such as a predefined envelope of spectral amplitudes and random phase properties, may not yet meet a quality criterion in the time domain, such as a predefined time domain amplitude distribution.

In a yet further embodiment of the method according to the invention, the or each predefined quality criterion comprises any of a group including a predefined time domain amplitude distribution and a predefined envelope of spectral amplitudes.

Accordingly, in a further embodiment of the method according to the invention, the processed represented first signal is arranged in accordance with a predefined time domain amplitude distribution.

In a still further embodiment of the method according to the invention, the processed represented first signal is arranged in accordance with a predefined envelope of spectral amplitudes.

For providing a signal which accurately meets predefined quality criteria in both the frequency and time domain, according to the invention, at least one of the time domain amplitude distribution and the envelope of spectral amplitudes is approached by an iteration process. Amplitude and frequency shaping may be repeated as often as required until both shapes meet the requirements within reasonable accuracy.

In an embodiment of the invention, the iteration process comprises a comparison, after any iteration step, of any of the time domain amplitude distribution and envelope of spectral amplitudes of the processed represented first signal with a predefined time domain amplitude distribution and predefined envelope of spectral amplitudes.

It has been observed that there is no need to perform a full time domain characteristic check after frequency shaping to figure out whether the time domain characteristics are close enough to the requirements. A simple check of the crest factor requirement has proven to be adequate in practice to enable the decision whether to stop or to continue with the iteration. The crest factor of the signal is defined as the relation of the maximum or peak amplitude of the tones of the signal compared to the average or rms value of the tones of the signal.

The method according to the invention as disclosed above is, in particular, suitable for generating, among others, crosstalk noise.

If a signal having the characteristics of ingress noise is to be generated, in a second aspect of the method according to the invention, the or each predefined quality criterion comprises at least one modulated carrier, the or each modulated carrier including any of a group comprised of a carrier frequency, a carrier amplitude, a modulation depth, and a modulation width.

By shaping the represented first signal in accordance with a quality criterion or quality criteria indicated above, a signal representing a particular type of ingress noise, having a particular time domain amplitude distribution, and a predefined envelope of spectral amplitudes can be easily and very efficiently provided.

In accordance with the method of the present invention, the signal meeting the or each predefined quality criterion can be provided by combining a plurality of signals processed as disclosed above.

For use of the signal in, for example, the testing of a communication network or a communication device, the processed represented signal has to be transformed from the frequency domain into the time domain using, among others, a FFT algorithm, for example.

The invention further provides to combine the signals generated in accordance with the first and second aspect as disclosed above. However, also other signal components may be included.

In particular, in accordance with the method of the present invention, the signal having the or each predefined quality criterion is a noise signal.

In a third aspect of the invention, a method is disclosed of testing the operation of a communication system, which method comprises the steps of:

generating a signal having a predetermined quality criterion in accordance with the method of the invention disclosed above, and transferring the signal through the communication system under test.

The signals can be generated and stored using a set of instructions in a code format and executed in a predetermined order on a device. Such set of instructions can be software code compiled on a computer and stored in the computer or a network of computers or a floppy or CD-ROM or through the Internet. The software and/or signals produced can also be stored on an Arbitrary Wave Form Generator (AWG) card and the AWG can be used to generate the signals or to reproduce stored signals from the memory. It is therefore possible to have a library of signals available stored on a data carrier that can be used in the execution or use of the method according to the invention.

The communication systems can be devices such as xDSL modems, or chips within or for such modems, or cables in the network, or networks for (tele)communication.

In a fourth aspect of the present invention a further method is disclosed of arranging a signal for use on or in a communication system. Preferably the signal is a noise signal. The signal may comprise crosstalk noise that is a random signal with predetermined properties in the frequency domain and in the time domain. The signal can furthermore comprise rfi-tones that have a discrete frequency spectrum. Also other signal components can be included in the signal.

The method comprising the steps of:

representing a first signal in time domain having a time domain amplitude distribution, the signal having a spectral density in the frequency domain, thereby achieving a represented signal;

processing the represented signal in accordance with a non-linear transformation, the non-linear transformation achieving at least one predefined quality criterion, the time domain amplitude distribution of the represented signal being processed at least with an inverse function of a predetermined time domain amplitude distribution.

The method may further comprise the step of comparing the time domain amplitude distribution of the represented signal with the predetermined time domain amplitude distribution, and thereafter arranging the non-linear transformation in order to achieve a processed represented signal having a time domain amplitude distribution approaching the predetermined time domain amplitude distribution.

In a fifth aspect of the present invention a method is disclosed of further comprising the step of comparing the time domain amplitude distribution of the represented signal with the predetermined time domain amplitude distribution, and thereafter arranging the non-linear transformation in order to achieve a processed represented signal having a time domain amplitude distribution approaching the predetermined time domain amplitude distribution.

According to the fifth aspect of the invention the method can also comprise the steps of representing a first signal in time domain and with an amplitude distribution and the signal having a spectral density in the frequency domain, thereby achieving a represented signal, and filtering the represented signal in the frequency domain including the steps of evaluating at least part of the signal representation in the frequency domain and thereafter processing the represented signal in the frequency domain.

The methods of the fourth and fifth aspect of the invention can be combined. The methods of the fourth and fifth aspect of the invention allow to make a signal in different iterative steps that has a predetermined amplitude distribution and/or that has a predetermined spectral density or that has a amplitude distribution and/or that has a spectral density according to a predefined quality criterion. The predefined quality criterion can be the crest factor of the signal, that is the relation of the maximum or peak value of tones of the signal compared to the average value or rms-value of the tones of the signal. The processing steps as recited hereabove can comprise the steps of a Fast Fourier Transformation (FFT) or Inverse Fast Fourier Transformation (IFFT). The processing steps can also a include operations such as a convolution or deconvolution or multiplication or add-on of signals.

In the method of the fourth aspect, the amplitude distribution of the represented signal is processed including a function of the predetermined amplitude distribution, which can include an inverse function of the predetermined amplitude distribution.

The method as recited of the fourth and fifth aspect of the invention can further comprise the steps of transforming the first signal in the frequency domain; multiplying the first signal in the frequency domain with a spectral envelope thereby achieving a multiplied signal; and thereafter representing the multiplied signal in time domain.

In the methods, the first signal in its representation in the frequency domain can be generated as a set of random numbers, preferably complex numbers the modulus of the complex number characterizing amplitude, the argument of the complex number characterizing phase and the real and/or the imaginary part of essentially each of the complex numbers can be chosen according to a Gaussian distribution. Each of the complex numbers can be substantially equal to the amplitude of the predetermined spectral density.

In a sixth aspect of the present invention, a signal is disclosed comprising at least a random noise signal, the random signal having an amplitude distribution in the time domain according to a predetermined quality criterion and a spectral density in the frequency domain according to a predetermined quality criterion, the random signal being composed of an array of random numbers. The signal can further comprise a discrete frequency spectrum. The noise signal can be generated using a set of instructions in a code format and being executed in a predetermined order. Such set of instructions can be software code compiled on a computer and stored in the computer or a network of computers or a floppy or CD-ROM or through the internet. The software can also be stored on an Arbitrary Wave Form Generator (AWG) card and the AWG can be used to generate the signals or reproduce stored signals from the memory. It is therefore possible to have a library of signals available that can be used in the execution or use of the methods of the fourth and fifth aspect of the invention.

In a seventh aspect of the present invention, a method is disclosed of generating a signal comprising at least a random noise signal, the random signal having an amplitude distribution in the time domain according to a predefined quality criterion and having a spectral density in the frequency domain according to a predefined quality criterion, the random signal being composed of an array of random numbers, the method comprising the step of generating a random set of numbers using a set of instructions in a code format and being executed in a predetermined order. The method can further comprise the step of generating a discrete frequency spectrum, the discrete frequency spectrum using goniometry functions and modulating essentially each of the discrete frequencies with a noise characteristic. The random noise signal and the discrete frequency spectrum can be combined using a set of instructions in a code format and being executed in a predetermined order.

In an eight aspect of the present invention, a set of instructions is disclosed in a code format and executable in a predetermined order, the set of instructions being arranged for generating a random noise signal and a discrete frequency spectrum, the random signal having an amplitude distribution in the time domain according to a predetermined quality criterion and having a spectral density in the frequency domain according to a predetermined quality criterion. Such set of instructions can be software code compiled on a computer and stored in the computer or a network of computers or a floppy or CD-ROM or through the internet. The software can also be stored on an Arbitrary Wave Form Generator (AWG) card and the AWG can be used to generate the signals or reproduce stored signals from the memory. It is therefore possible to have a library of signals available that can be used. The software can be C-code or can be compiled in a MATLAB environment.

In a ninth aspect of the present invention, a system for testing the operation of a communication system is disclosed comprising a set of instructions in a code format and executable in a predetermined order and compiled on a device, the set of instructions being arranged for generating a noise signal comprising at least one of a random noise signal and a discrete frequency spectrum, the random signal having an amplitude distribution in the time domain according to a predetermined quality criterion and having a spectral density in the frequency domain according to a predetermined quality criterion. The test system according to this aspect of the invention can comprise an impairment generator for generating the noise signal.

The connection elements (transformers, active devices, attenuators, etc.) that connect the impairment generator to the communication system that is tested can have an unwanted frequency dependent response. The unwanted frequency dependent response can be measured for instance by generating specific test signals in the impairment generator. The unwanted frequency dependent response can be compensated by multiplying the desired spectral density of the signal divided by the unwanted frequency dependent response of the connection element.

In a tenth aspect of the present invention, a method of testing the operation of a communication system such as a xDSL modem is disclosed. The method comprises the step of superposing on a signal transceived by a the modem, a signal comprising at least one of a random noise signal and a discrete frequency spectrum, the random signal having an amplitude distribution in the time domain according to a predefined quality criterion and having a spectral density in the frequency domain according to a predetermined quality criterion, the noise signal furthermore being composed of an array of random numbers.

In an eleventh aspect of the present invention a method of testing the quality of operation of a communication system is disclosed. The method comprises the steps of superposing on a signal transceived by a the modem, a signal comprising at least one of a random noise signal and a discrete frequency spectrum, the random signal having an amplitude distribution in the time domain according to a predetermined quality criterion and having a spectral density in the frequency domain according to a predefined quality criterion, the noise signal furthermore being composed of an array of random numbers, and evaluating the transceived signal according to a predefined quality criterion.

Yet in a twelfth aspect of the present invention, a method of improving the design and/or production of a communication system is disclosed, the method comprising the steps of superposing on a signal transceived by the modem, superposing on a signal transceived by the modem, a signal comprising at least one of a random noise signal and a discrete frequency spectrum, the random signal having an amplitude distribution in the time domain according to a predetermined quality criterion and having a spectral density in the frequency domain according to a predetermined quality criterion, the noise signal furthermore being composed of an array of random numbers; evaluating the transceived signal according to a predetermined quality criterion; and iteratively arranging the design of the modem in order to approach closer to the quality criterion for evaluating the transceived signal.

In a thirteenth aspect of the present invention, a telecommunication network is disclosed including a signal comprising at least one of a random noise signal and a discrete frequency spectrum, the random signal having an amplitude distribution in the time domain according to a predetermined quality criterion and having a spectral density in the frequency domain according to a predetermined quality criterion, the noise signal furthermore being composed of an array of random numbers.

The features of the above-described aspects and embodiments of the invention can be combined.

The signal, the methods and the set of instructions recited hereabove will allow to have a better quality of signal transmission over media such as telephone cables or wireless media. A better transmission of signals allows for a broader providing of more services for the users of communication systems.

DETAILED DESCRIPTION OF THE EMBODIMENTS

For the purpose of teaching the invention, aspects and embodiments of the signal and method and systems of the invention are described below. It will be appreciated by those skilled in the art that other alternative and equivalent embodiments of the invention can be conceived and reduced to practice without departing form the true spirit of the invention. The scope of the invention being limited only by the appended claims.

In an embodiment of the invention, a system for testing the operation of a communication system such as a xDSL transceiver is disclosed. The set up of a test equipment for a high penetration of systems scenario in operational access networks is described.

A method is disclosed of arranging a signal for use on or in a communication system.

The purpose of transmission performance tests is to stress xDSL transceivers in a way that is representative to a high penetration of systems scenario in operational access networks. This high penetration approach enables:

(i) component and system designers to quantify the performance and to use it to improve their design and to prove compliance with standards; and (ii) operators to define deployment rules that apply to most operational situations.

Figure 1:
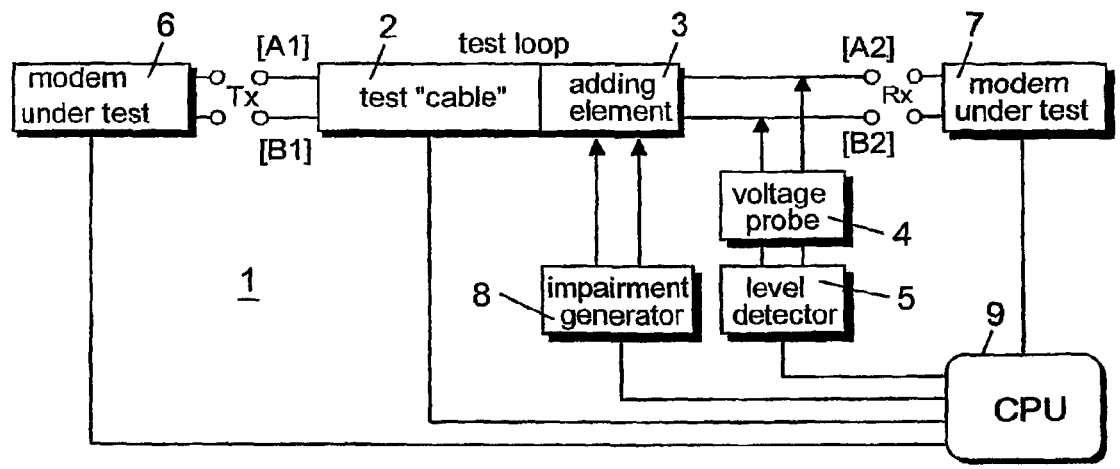
FIG. 1 shows, in a block diagram, a set-up for a performance test in a communication system, using an impairment generator operating in accordance with the method of the present invention.

FIG. 1 illustrates the functional description of a possible test set-up 1. It includes:

a test loop 2, being a real cable or a cable simulator;

an adding element 3 to inject impairment noise into the test loop 2;

a high impedance, and well balanced differential voltage probe 4, connected with level detectors 5 such as a spectrum analyzer or an rms volt meter, for example, (not shown), and xDSL transceivers (modems) 6, 7 under test.

When external splitters are required for the xDSL system under test (for POTS or ISDN signals), these splitter can be included in the modems 6, 7 under test.

The signal flow through the test equipment set-up 1 is from port Tx to port Rx, which means that measuring upstream and downstream performance requires an interchange of transceiver position and test "cable" ends. The received signal level at port Rx is the level, measured between node A2 and B2, when port Tx as well as port Rx are terminated with the xDSL transceivers (modems) 6, 7 under test. The impairment generator 8 is switched off during this measurement. The transmitted signal level at port Tx is the level, measured between node A1 and B1, under the same conditions.

The noise that the impairment generator 8 should inject into the test set-up 1 is frequency dependent. The noise which the impairment generator 8 injects into the test set-up 1 should be a realistic representation of a real (spectral polluted) access network, and is:

(a) dependent on the length of the test loop 2, and (b) different for downstream performance tests and upstream performance tests. This impairment noise, measured between node A2 and B2, is usually a mix of random, impulsive and harmonic noise (the rfi-tones). A set of characteristics is identified as a "noise profile".

The signal and noise levels are probed with a well balanced differential voltage probe 4.

In a fully automated test set-up 1 the test loop 2, 3 the voltage probe 4 and level detector 5, the modems under test 6, 7 and the impairment generator 8 may connect to a Central Processing Unit (CPU) 9, as schematically indicated with broken lines. Those skilled in the art will appreciate that the connections with the CPU 9 may involve data links for remote testing by the CPU 9.

Definitions that are relevant for the use of the test equipment are the following:

Probing an rms-voltage $U_{rms}$ [V] in this set-up, over the full signal band, means a power level of P [dBm] that equals: $P=10\times\log_{10}(U_{rms}^2/R_v\times1000)$ [dBm];

Probing an rms-voltage $U_{rms}$ [V] in this set-up, within a small frequency band of $\Delta f$ (in Hertz), means a power spectral density level_of P [dBm/Hz] within that filtered band that equals: $P=10\times\log_{10}(U_{rms}^2/R_v\times1000/\Delta f)$ [dBm/Hz];

The bandwidth $\Delta f$ identifies the noise bandwidth of the filter, and not the −3 dB bandwidth.

Figure 2:
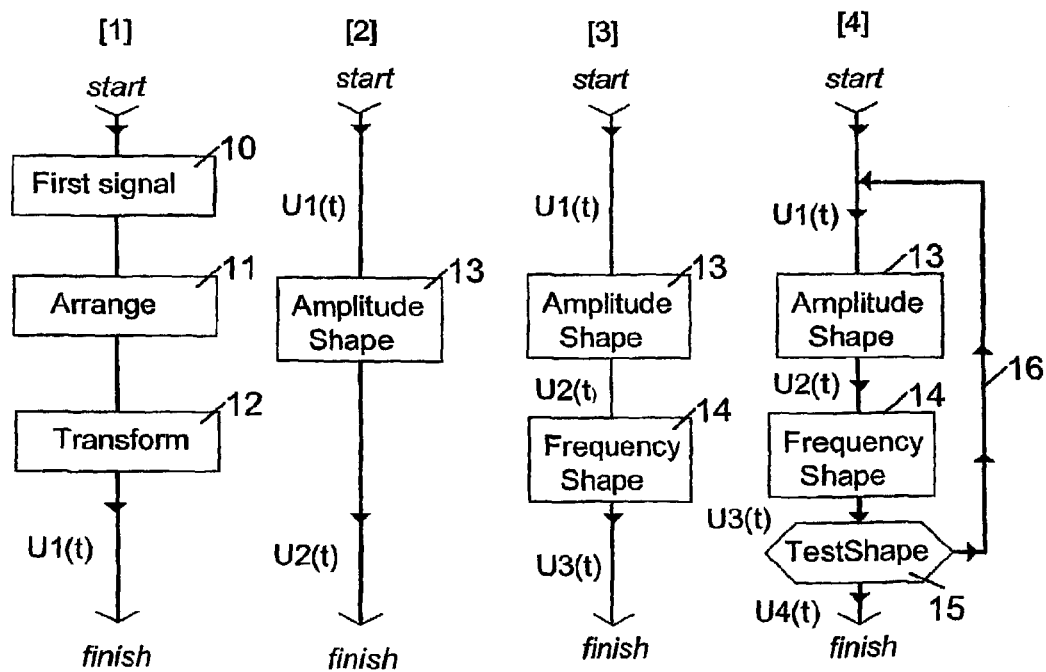
FIG. 2 shows a flow diagram type of embodiments of the method according to the invention.

FIG. 2 shows schematically embodiments of the method for arranging a signal Ui(t) i=1, 2, 3, . . . for use on or in a communication system in accordance with the invention. The signal may comprise cross-talk noise, that is a random signal with predetermined properties in the frequency domain and in the time domain.

As represented by flow [1] of FIG. 2, the method comprises the steps of representing a first signal comprising a plurality of frequency components each having spectral amplitude and phase properties, block 10 "First signal", and processing the represented signal by arranging the spectral amplitude properties in accordance with at least one predefined quality criterion, as well as arranging random phase properties, block 11 "Arrange", thereby achieving a processed represented signal.

The first signal may be represented by a first set of numbers specifying a spectral amplitude and phase of each frequency component. Further, the first signal may be represented by a second set of complex numbers, having a real part and an imaginary part, which parts in combination specify a spectral amplitude and phase of each frequency component. That is, the modulus of a complex number characterizes the spectral amplitude whereas the argument of the complex number characterizes the phase of the frequency component.

In accordance with the present invention, the represented first signal 10 is processed to arrange random phase properties. However, starting from a represented first signal 10 having random phase properties, for shaping the frequency of the signal in accordance with the predefined quality criterion, it suffices to shape the spectral amplitude of the frequency components.

The method may also comprise the steps of representing the first signal in the time domain, in that the first signal is represented by a third set of numbers each specifying an amplitude of the first signal in the time domain. By transforming the third set of numbers from the time domain into the frequency domain, for example using an FFT algorithm, a fourth set of numbers is achieved specifying a spectral amplitude and phase of each frequency component. Likewise, the fourth set of numbers is to be processed by arranging the spectral amplitude properties in accordance with the at least one predefined quality criterion, as well as arranging its random phase properties.

By transforming the processed represented signal from the frequency domain into the time domain, for example using an Inverse FFT algorithm (IFFT), block 12 "Transform", the signal U1(t) having the at least one predefined quality criterion is eventually generated.

While the signal U1(t) meets at least one predefined quality criterion in the frequency domain, such as a spectral envelope and/or pre-emphasis properties, it may yet be required to provide a signal having a predefined quality criterion in the time domain.

As disclosed in flows [2] and [3] of FIG. 2, i.e. block 13 "Amplitude Shape" and block 14 "Frequency Shape", the quality criterion in the time domain may comprise a predefined amplitude distribution and/or a predefined envelope of spectral amplitudes.

The method can also comprise the step of making a signal in different iterative steps, see FIG. 2. Block 15 "Test Shape" and back coupling loop 16. Thus the signal can have a predetermined time domain amplitude distribution and/or a predetermined envelope of spectral amplitudes and/or a spectral density according to predetermined quality criterion's.

The at least one predetermined quality criterion can be the crest factor of the signal that is a relation of the maximum or peak value of the tones of the signal compared to the average or rms value of the tones of the signal.

The signals can be generated and stored using a set of instructions in a code format and executable in a predetermined order and compiled on a device. Such set of instructions can be software code compiled on a computer and stored in the computer or a network of computers or a floppy or CD-ROM or through the Internet. The software can also be stored on an Arbitrary Wave Form Generator (AWG) card and the AWG can be used to generate the signals or reproduce stored signals from the memory. It is therefore possible to have a library of signals available that can be used in the execution or use of the methods of the first and second aspect of the invention. The communication systems can be devices such as xDSL modems 6, 7, or chips within or for such modems 6, 7, or networks for telecommunication.

The processing in block 13 "Amplitude Shape" in FIG. 2 is done for achieving an impact or control on the time domain characteristics. An amplitude distortion (transformation) function Q(x) is chosen that amplifies the high amplitude peaks or tones in the signal. A non-linear transformation function Q(x) can be reconstructed from the actual amplitude distribution function of the signal and the predetermined amplitude distribution function.

For a noise signal f(t) in the time period t in between 0 en T, the amplitude distribution F(a) of the signal is defined as a fraction of the time that the noise f in absolute value is larger than a. If G(a) is the predetermined amplitude distribution (such as an enhanced-Gaussian, see below), and $G^{-1}(a)$ is the inverse function thereof, the transformation function Q(x) to make an intermediate or final signal g(t) from the noise signal f(t) can be defined as:

$$Q(x) = \text{sign}(x) \cdot G^{-1}(F(|x|)) \quad (1)$$

$$g(t) = Q\{f(t)\}; \quad (2)$$

$$\text{sign}(x) = x/|x| \text{ for } x \ne 0; \text{ sign}(x) = 0 \text{ for } x = 0;$$

As a result g(t) will have the predetermined amplitude distribution G(a). Q(x) in a number of cases can be an analytical function but can also be numerically constructed. An example of an enhanced Gaussian function is as follows.

The amplitude distribution of Gaussian type noise is:

$$G(x) = 1 - \text{erf}\left(\frac{x}{\sqrt{2}\sigma}\right) \quad (3)$$

with:

$$\text{erf}(x) = \frac{2}{\sqrt{\pi}} \int_0^x dt \exp(-t^2), \quad (4)$$

and with σ being the RMS value of the signal.

The "enhanced" Gaussian distribution is defined as:

$$G(x) = \begin{cases} 1 - \dfrac{\left(\alpha \dfrac{x}{A} + \text{erf}\left(\dfrac{x}{\sqrt{2}\sigma}\right)\right)}{\left(\alpha + \text{erf}\left(\dfrac{A}{\sqrt{2}\sigma}\right)\right)} & 0 \le x \le A \\ 0 & x > A, \end{cases} \quad (5)$$

If $V_{RMS}$ is the desired RMS value of the noise sample, and $C_f$ being the desired crest factor, choose:

$$A = C_f \times V_{RMS}, \text{ and} \quad (6)$$

$$\sigma = \sqrt{((1+\alpha)V^2_{RMS} - A^2 \cdot \alpha/3)}. \quad (7)$$

Typical values for α that have proven useful are of a magnitude between 0.001 and 0.01, and this represents the deviation of enhanced Gaussian distributed from a true Gaussian distribution.

In block 14, Frequency Shape, of FIG. 2, the frequency domain characteristics of the signal are improved, as a posed-processing step to achieve a closer match to the or each quality criterion. The corrected frequency curve can be achieved, for example, by comparing (dividing) a predetermined spectral density through the measured spectral density of the (intermediate) signal U2(t). An example hereof is given in the best mode embodiment described in the sequel with a convolution of FFT functions.

In the part [4] of FIG. 2, it is shown how an iterative procedure of the steps detailed here above may lead to a further improvement of the finish or final signal for use in or on a communication system. The iterative procedure, i.e. testing of the frequency shape by block 15, Test Shape, and back coupling loop 16, is executed until the predetermined quality criterion(s) are achieved.

Figure 3:
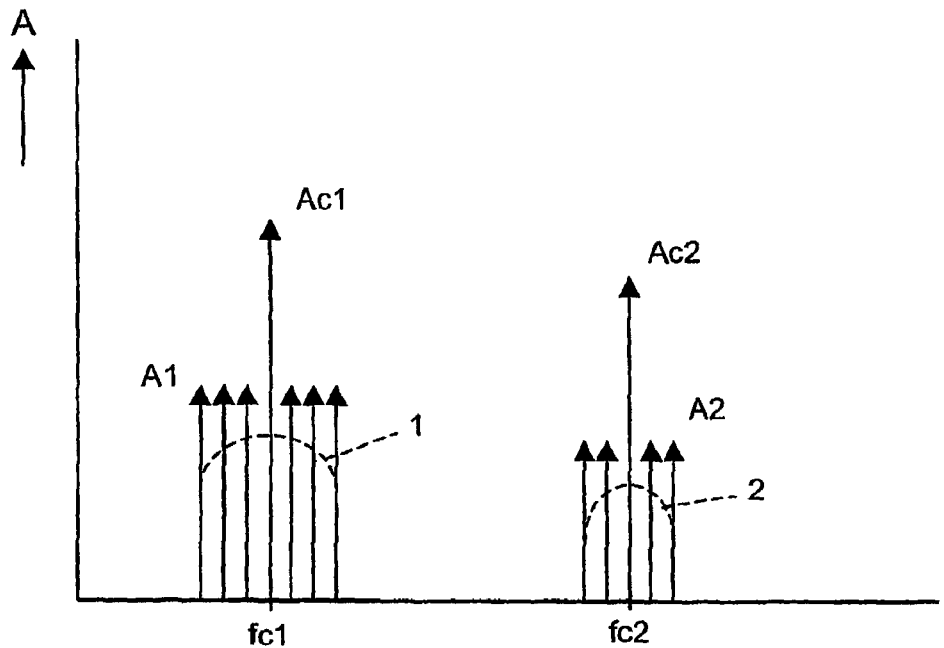
FIG. 3 shows, in a graphic representation, an embodiment of the method according to the invention for generating ingress noise.

FIG. 3 illustrates in a schematic, graphic representation use of the method according to the invention for the provision of an ingress noise signal.

As disclosed in the preamble, ingress noise may be characterised by a plurality of frequency components at discrete carrier frequencies fci, i=1, 2, 3, . . . . The frequency components at the carrier frequency fci each having a carrier amplitude Aci, i=1, 2, 3, . . . , and, if applicable, having a modulation width, i.e. a number of discrete frequencies at the left and right hand side of the associated carrier frequency fci, as well as having a modulation depth, that is the amplitude of the side frequencies associated with the respective carrier frequency fci.

FIG. 3 shows, in a graphic representation having a horizontal or frequency axis f and a vertical or amplitude axis A, by way of example only, a signal comprised of two carrier frequencies fc1 and fc2, having a carrier amplitude Ac1 and Ac2, respectively.

Around the carrier frequency fc1 at each side thereof three side frequency components are arranged, each having an amplitude A1. For the frequency component at carrier frequency fc2 on each side thereof two side frequency components are arranged, each having an amplitude A2.

In accordance with the present invention, for providing a signal having at least one predefined quality criterion, the amplitude of the frequency components have to be shaped, such as disclosed by the dotted lines 1 and 2 in FIG. 3.

Starting from a represented first signal having random phase properties, in accordance with the present invention, by the shaping of the amplitudes, the random phase properties are maintained in the signal to be provided having the predefined quality criterion.

Figure 4:
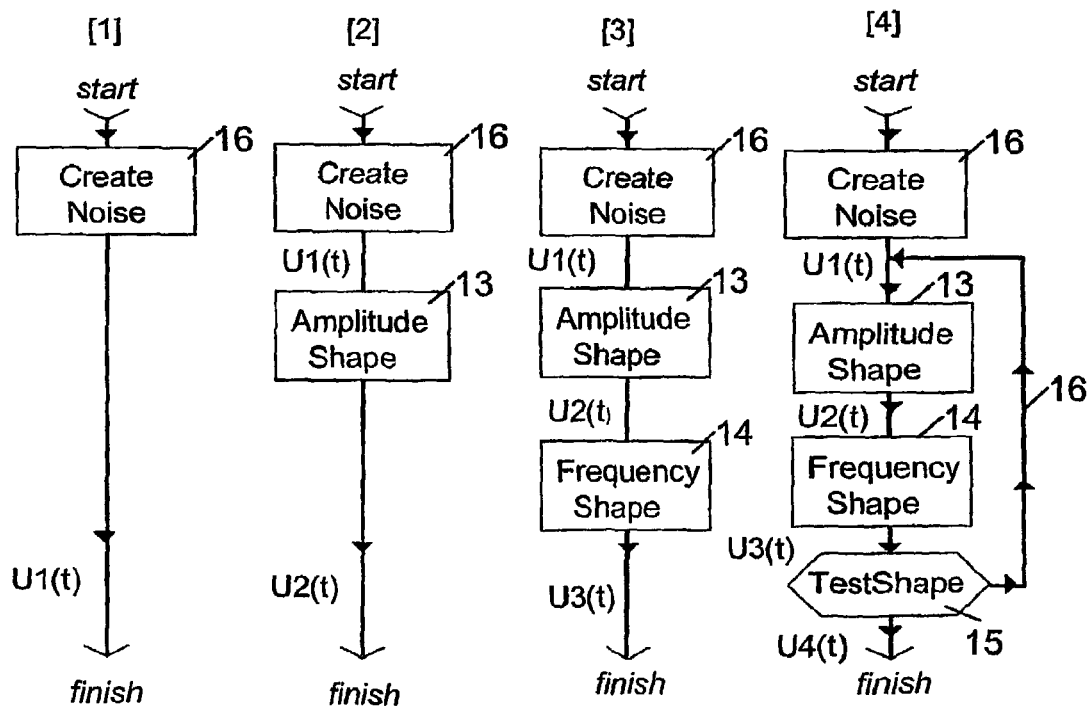
FIG. 4 shows a flow diagram type of further embodiments of a method according to the invention.

FIG. 4 shows schematically a further embodiment of a method for arranging a signal for use in or on a communication system, in particular for use if random phase properties are already provided for. The signal comprises crosstalk noise that is a random signal with predetermined properties in the frequency domain and in the time domain. The signal can furthermore comprise rfi-tones that have a discrete frequency spectrum. Also other signal components can be included in the signal.

The method further may comprise the steps of representing a first signal in time domain and with an amplitude distribution and the signal having a spectral density in the frequency domain, thereby achieving a represented signal, and processing the represented signal according to a non-linear transformation, the non-linear transformation achieving a predetermined quality criterion. This is shown as amplitude shaping in FIG. 4, flows [2-4].

The method further may comprise the step of representing a first signal in time domain and with an amplitude distribution and the signal having a spectral density in the frequency domain, thereby achieving a represented signal, and processing the represented signal until a signal is achieved having a spectral density according to a predetermined spectral density quality criterion. This is shown as frequency shaping in FIG. 4, flows [2-4]. The frequency shaping step can also comprise the step of filtering the represented signal in the frequency domain including the steps of evaluating at least part of the signal representation in the frequency domain and thereafter processing the signal representation in the frequency domain.

The method may also comprise the step of making a signal in different iterative steps, see FIG. 4 flow [4]. Thus the signal can have a predetermined time domain amplitude distribution and/or a predetermined spectral density or a time domain amplitude distribution and/or a spectral density according to a predefined quality criterion. The predefined quality criterion can be the crest factor of the signal, that is a relation of the maximum or peak value of the tones of the signal compared to the average value of the tones of the signal. The signals can be generated and stored using a set of instructions in a code format and executable in a predetermined order and compiled on a device.

Likewise, the set of instructions can be software code compiled on a computer and stored in the computer or a network of computers or a floppy or CD-ROM or through the internet. The software can also be stored on an Arbitrary Wave Form Generator (AWG) card and the AWG can be used to generate the signals or reproduce stored signals from the memory. It is therefore possible to have a library of signals available that can be used in the execution or use of the methods of the invention. The communication systems can be devices such as xDSL modems, or chips within or for such modems, or networks for telecommunication. In detail the following embodiment is shown in FIG. 4.

Using software, random numbers are generated, block 16, "Create Noise". In hardware white noise can be generated. The random numbers are filtered until a predetermined spectral density is achieved. The random numbers that are generated each represent a frequency component. The necessary processing to achieve a predetermined spectral density is executed by scaling the amplitude of the complex numbers and thereafter an IFFT processing is done in order to make the desired noise signal. Another way of executing the method is to generate random numbers that represent the phase of each frequency component and thereafter the amplitude of the complex numbers is arranged to approach or be equal to a predetermined spectral density.

Figure 5:
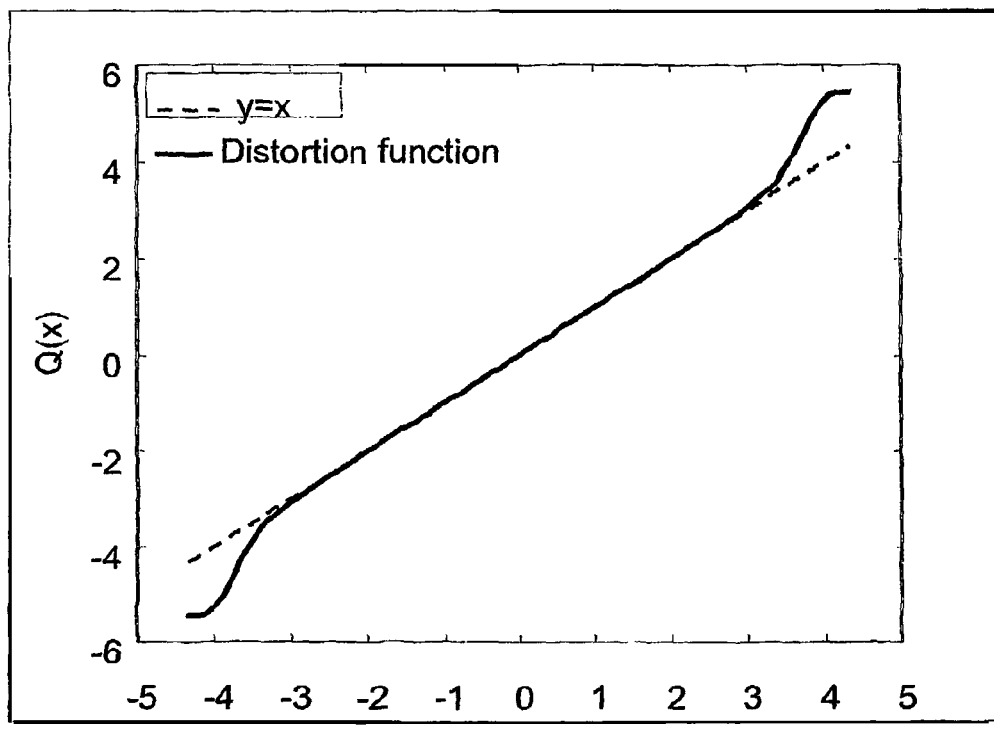
FIG. 5 shows an amplitude distortion (non-linear transformation) function $Q(x)$ that amplifies the high amplitude peaks or tones in a signal.

The processing in block 13, "Amplitude Shape", is done for achieving an impact or control on the time domain characteristic. An amplitude distortion (transformation) function Q(x) is chosen that amplifies the high amplitude peaks or tones in the signal is shown in FIG. 5. The non-linear transformation function Q(x) can be reconstructed from the actual amplitude distribution function of the signal and the predetermined amplitude distribution function, as disclosed above in connection with the equations (1-7).

In block 14, "Frequency Shape" of FIG. 4, the frequency domain characteristics of the signal are improved. The corrected frequency curve is achieved by comparing (dividing) a predetermined spectral density through the measured spectral density of the (intermediate) signal. An example hereof is given in the best mode embodiment described in the sequel with a convolution of FFT functions.

In the flow [4] of FIG. 4, like in the flow [4] of FIG. 2, again it is shown how an iterative procedure of the steps detailed hereabove may lead to a further improvement of the final for use in or on a communication system. The iterative procedure is executed until the predetermined quality criterions are achieved.

With the method according to the invention, as disclosed above, signals representing cross-talk noise and ingress noise can be generated with a device, such as an impairment generator 8, see FIG. 1, which may be arranged for providing a signal comprised of both a cross-talk noise signal and an ingress noise signal, while other signal components may be added to the output signal to be provided, if required.

The signal to be provided, in an embodiment of the invention, can be advantageously provided as a sixth set of numbers in the time domain, for example an array of numbers.

Figure 6:
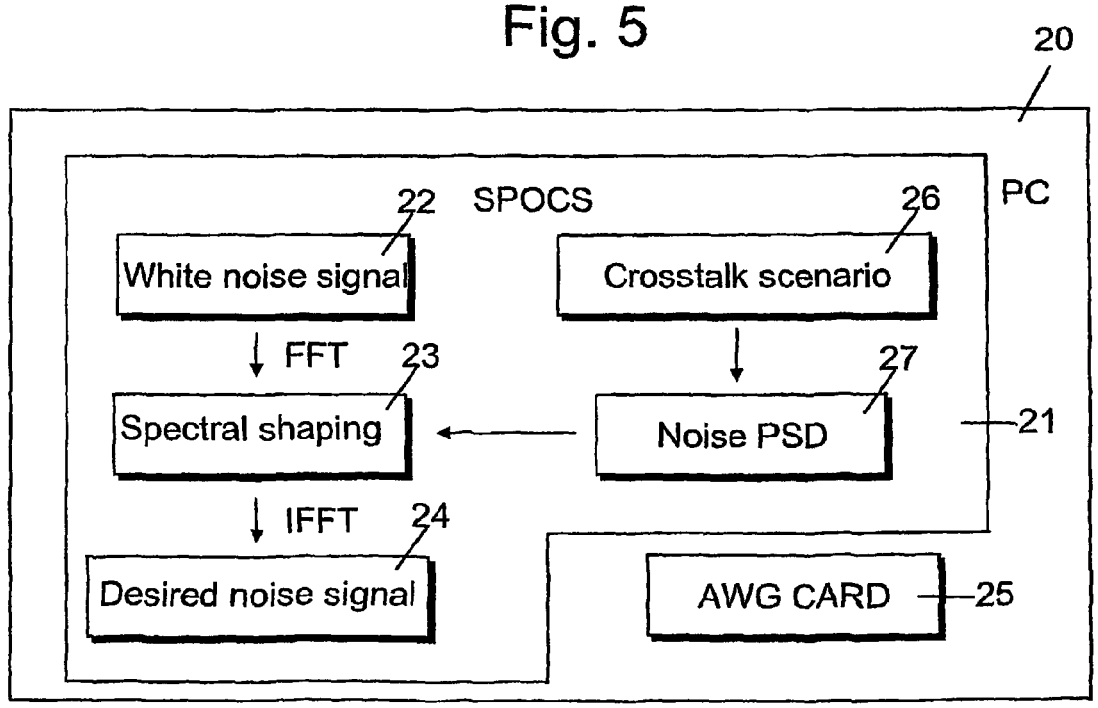
FIG. 6 shows in a flow diagram an example embodiment of the invention.

FIG. 6 shows, in a flow type diagram, an example embodiment of the invention, running on a Personal Computer 20. The impairment noise is generated by block 21, called SPOCS, comprising a block 22, "White noise signal", a block 23 "Spectral shaping", provided by FFT, a block 24, "Desired noise signal", produced from the output of block 23 by IFFT, the resulting signal of which is stored on an AWG card 25. In the crosstalk scenario, i.e. block 26, a noise PSD is created, block 27, which is further processed by block 23.

A best mode embodiment of the set of instructions of the invention is disclosed here below. The code given here below is compiled in a MATLAB environment. Comments related to the functionality of the code are given after the % signs. For a person skilled in the art, the code provided is self-explanatory.

Figure 7:
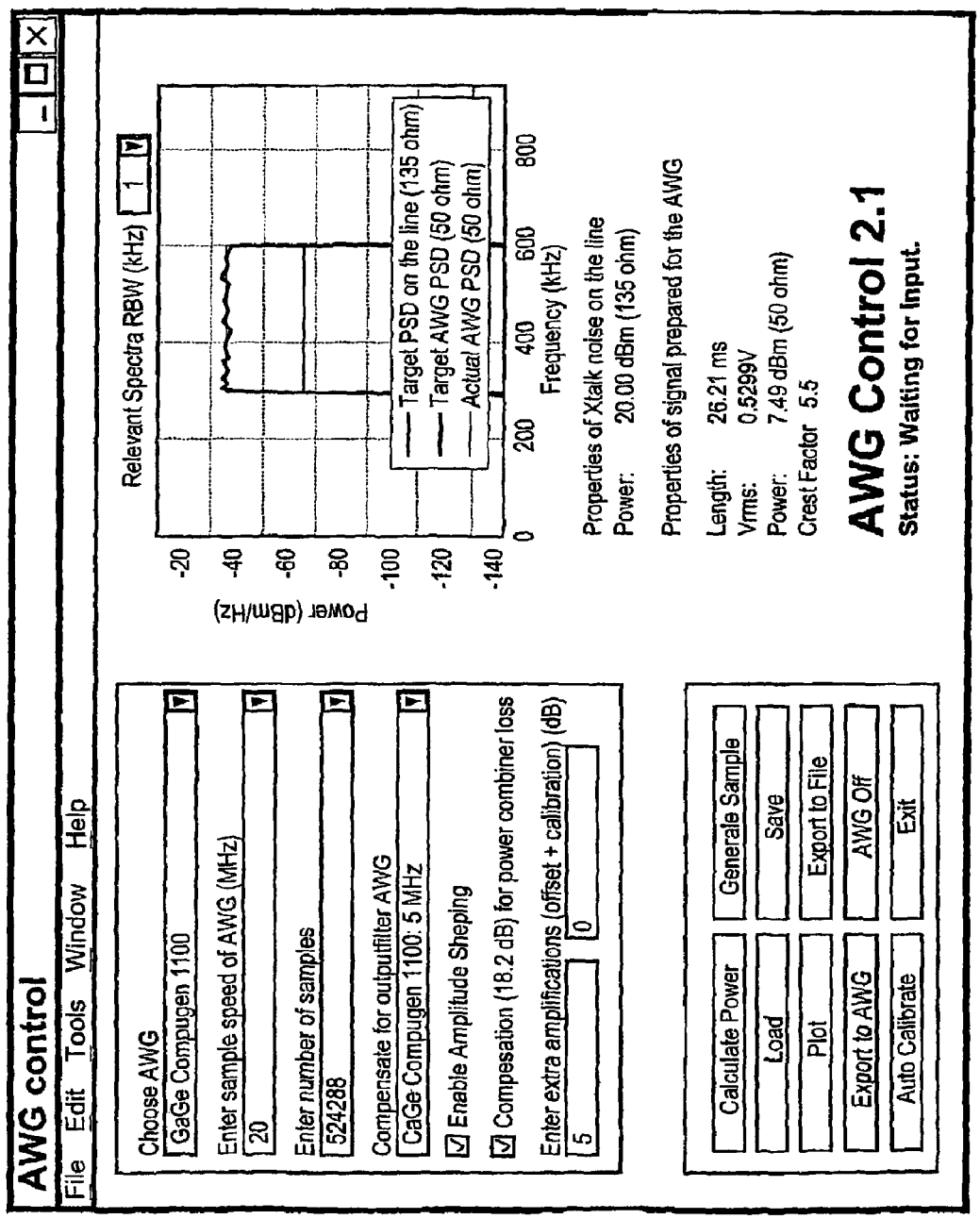
FIGS. 7-11 show results that are obtained according to an embodiment of the invention.
Figure 8:
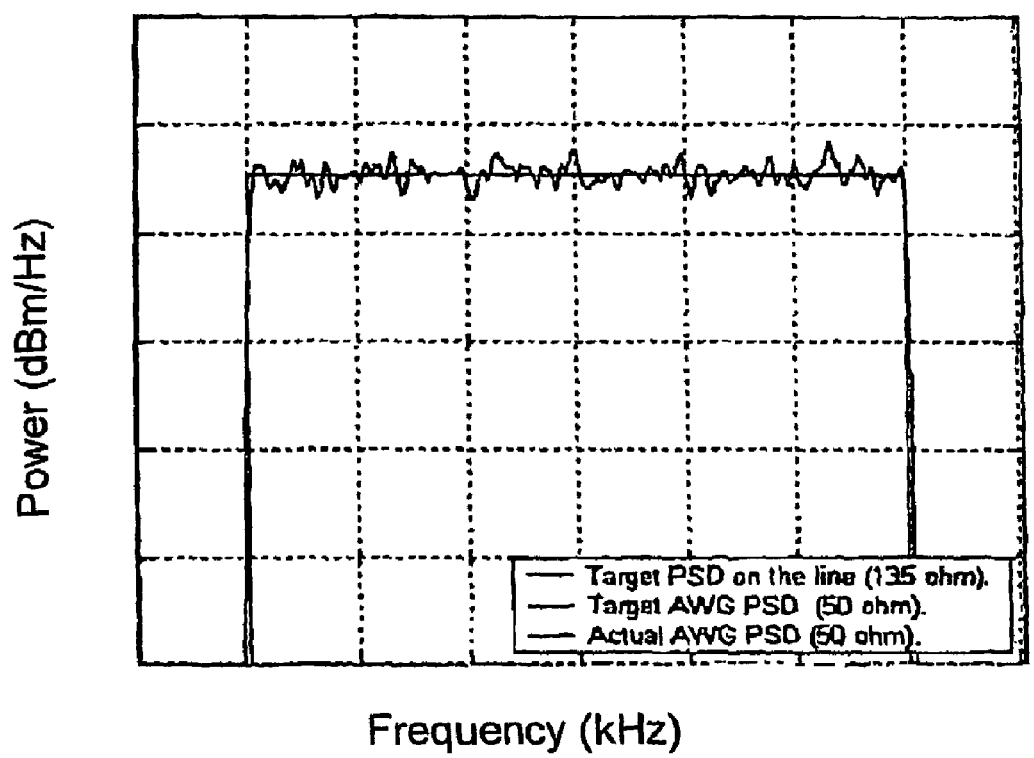
Figure 9:
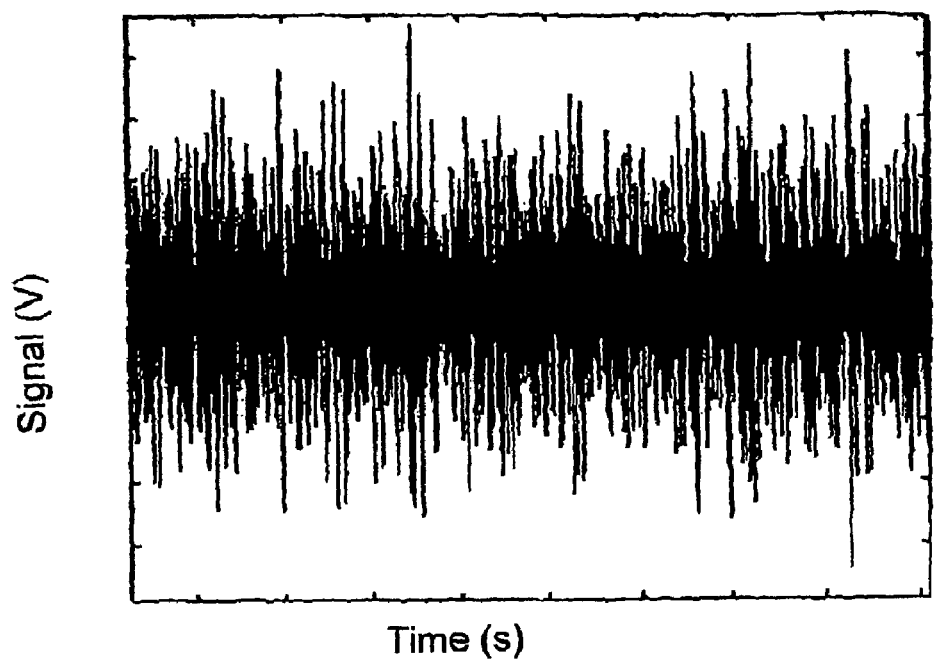
Figure 10:
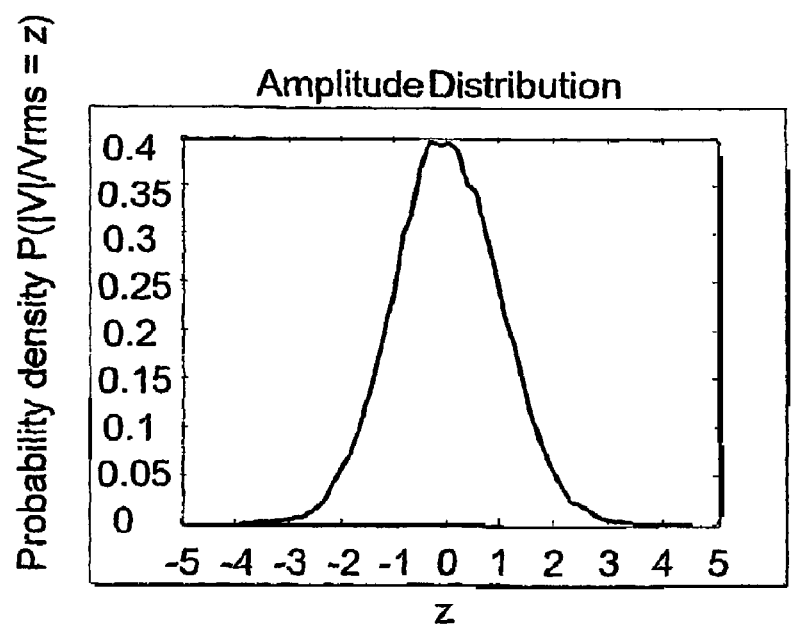
Figure 11:
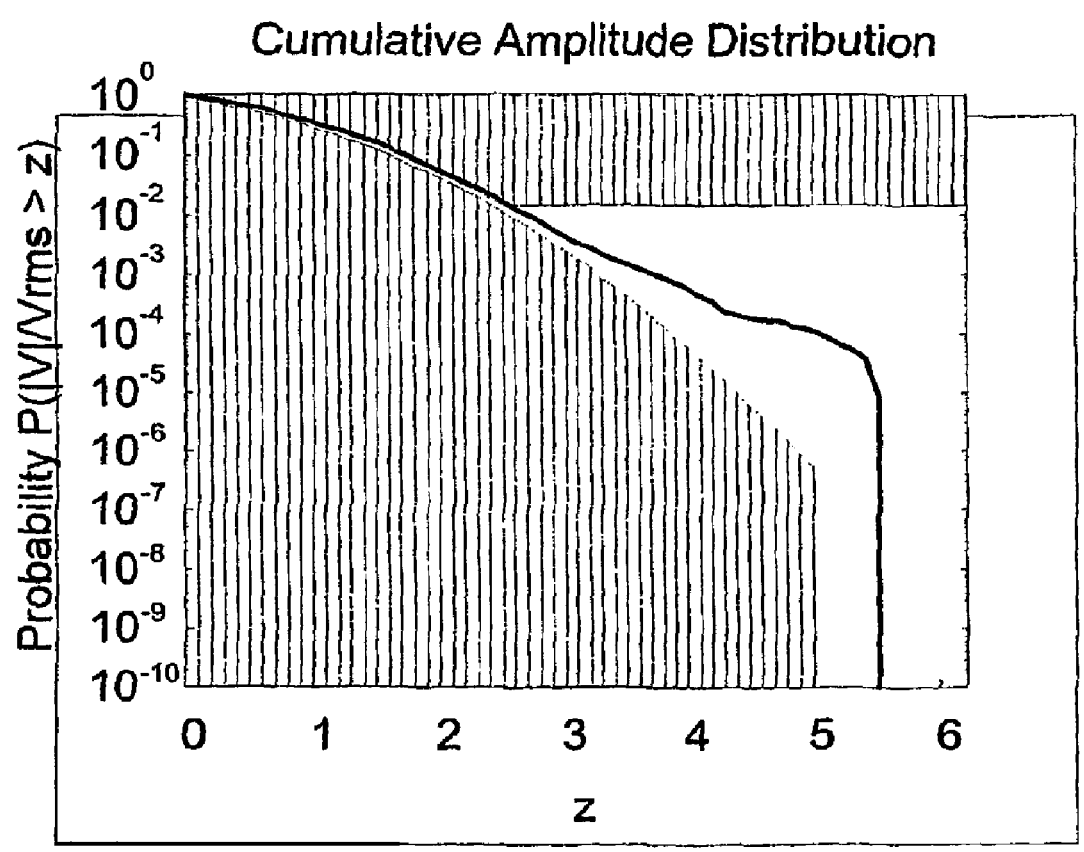

FIGS. 7-9 show results obtained with the best mode embodiment. FIG. 8 shows a plot of the spectrum of the generated noise sample plus the PSD of the noise profile. FIG. 9 shows a plot of the generated noise sample in the time domain. FIG. 10 shows a plot of the distribution function of the generated noise sample. FIG. 11 shows a plot of the cumulative distribution function of the generated noise sample. FIG. 7 shows a graphical User Interface (UI) and settings of the AWG control.

```
%---------------------------------------------------------------------------------
function DemoImpair2;
%---------------------------------------------------------------------------------
% DemoImpair2
%       Code, programmed in the Matlab programming language, that demonstrates the
%       basic algorithms of an Impairment Generator.
%       The demonstrated algorithms have full control over the predefined quality
%       criteria, such as:
%       - frequency and time domain characteristics (spectrum; probability
%           distribution) when generating noise with continuous spectra
```

```
%           - carrier amplitude, carrier frequency, modulation depth and modulation
%             width, when generating noise with discrete spectra
%           Both types of noise are calculated independently, and represented in the time
%           domain as arrays with numbers.
%           Both types of noise can be made available simultaneously by adding these
%           arrays element wise.
%           (c) 2000-2001 KPN Research;
%
% DEMO FUNCTIONS
%       DemoXtalkNoise              - shows the process of creating continuous noise
%       DemoIngressNoise            - shows the process of creating discrete noise
%
% MAIN FUNCTIONS: Noise is represented as an array with random numbers
%       DefineShape                 - initialize all user-definable parameters
%       CreateNoiseCont             - generates continuous noise
%       CreateNoiseDiscr_Fast       - generate discrete noise, fast algorithm
%       CreateNoiseDiscr_Slow       - generate discrete noise, slow algorithm
%       FrequencyShape              - modify spectral density of continuous noise
%       AmplitudeShape              - modify amplitude distribution of continuous
%                                     noise
% SUPPORTING FUNCTIONS:
%       CalcSpec                    - calculates the spectral density of noise
%       CalcNBSV                    - calculates the narrow band signal voltage of
%                                     noise
%       CalcCrest                   - calculates the crest factor of noise
%       CalcDistrib                 - calculates the probability distribution of noise
%       CalcCumDistrib              - calculates the cumulated distribution of noise
%       CalcSmooth                  - smoothes a spectrum, like in a real spectrum
%                                     analyzer
%       CalcEnhancedGaussDistribution   - a sample of a near-gaussian distribution
%       CalcDemodulation            - calculate the noise modulated on a carrier
%---------------------------------------------------------------------------
Shape=DefineShape;
DemoXtalkNoise(Shape);
DemoIngressNoise(Shape);
%---------------------------------------------------------------------------
function [U,t] =DemoXtalkNoise(Shape);
%---------------------------------------------------------------------------
% demonstrates the generation of noise with continuous spectrum
% e.g. for crosstalk testing
R       = Shape.R;
CF_min = Shape.Xtalk.CF_min;
[U,t]=CreateNoiseCont(Shape);       plot(t,U);          title('Xtalk method 1'); shg; pause
[X,f]=CalcSpec(U,t);                plot(f,X);          title('Xtalk method 1'); shg; pause
[X,f]=CalcSpec(U,t);                plot(f,dBm(X,R));   title('Xtalk method 1'); shg; pause
[P,u]=CalcCumDistrib(U);            plot(u,P);          title('Xtalk method 1'); shg; pause
%
U=AmplitudeShape(U,Shape);          plot(t,U);          title('Xtalk method 2'); shg; pause
[X,f]=CalcSpec(U,t);                plot(f,X)           title('Xtalk method 2'); shg; pause
[X,f]=CalcSpec(U,t);                plot(f,dBm(X,R));   title('Xtalk method 2'); shg; pause
[P,u]=CalcCumDistrib(U);            plot(u,P);          title('Xtalk method 2'); shg; pause
%
U=FrequencyShape(U,Shape);          plot(t,U);          title('Xtalk method 3'); shg; pause
[X,f]=CalcSpec(U,t);                plot(f,X);          title('Xtalk method 3'); shg; pause
[X,f]=CalcSpec(U,t);                plot(f,dBm(X,R));   title('Xtalk method 3'); shg; pause
[P,u]=CalcCumDistrib(U);            plot(u,P);          title('Xtalk method 3'); shg; pause
%
for i=2:10
   i
   U=AmplitudeShape(U,Shape);
   [X,f]=CalcSpec(U,t);
   %
   U=FrequencyShape(U,Shape);
   [X,f]=CalcSpec(U,t);
   %
   if CalcCrest(U)>CF_min, break; end;
end;
[P,u]=CalcCumDistrib(U);
plot(t,U);              title('Xtalk method 4'); shg; %pause
plot(f,dBm(X,R));       title('Xtalk method 4'); shg; %pause
plot(u,P);              title('Xtalk method 4'); shg; %pause
%---------------------------------------------------------------------------
function [U,t]=DemoIngressNoise(Shape);
%---------------------------------------------------------------------------
% demonstrates the generation of noise with discrete spectrum e.g. for ingress testing
R = Shape.R;
[U,t]=CreateNoiseDiscr_Fast(Shape);
%[U,t]=CreateNoiseDiscr_Slow(Shape); %gives same result
[X,f]=CalcNBSV(U,t); plot(f,dBm(X,R)); title('Ingress method'); shg; pause
for ToneNr=[1:2]
```

```
[Uac,Uac_rms]=CalcDemodulation(U,t,Shape,ToneNr);
plot(t,Uac); title('demodulated ingress noise of one carrier'); shg; pause
[P,u]=CalcDistrib(Uac/Uac_rms);
plot(u,P); title('distribution of demod noise'); shg; pause
end;
%----------------------------------------------------------------------------------
function [Shape] = DefineShape;
%----------------------------------------------------------------------------------
%Create the noise profiles for the noise that should be generated, in terms of
%         - spectral density (in this example rectangular in nature)
%         - probability distribution (in this example near Gaussian)
%         - tones and modulation
%         Spectra in Volt per sqrt(Hz)
%----------------------------------------------------------------------------------
Fmax=4E6; F1=300E3; Fh=700E3; N=2^18; R=135;
cf=5.5;            % desired crest factor)
cf_min=5.1;        % desired crest factor)
m=N/2;
%
Shape.N=N;                              % number of time samples
Shape.m=m;                              % number of freq samples
Shape.dF= Fmax./(m-1);                  % frequency spacing
Shape.dT= 1/(N*Shape.dF);               % time spacing
Shape.R=R;                              % impedance of desired noise source;
% define crosstalk noise target (Spectral density & Amplitude Distribution)
Shape.Xtalk.freq =[0:m-1]' * Shape.dF;
Shape.Xtalk.spec =(Shape.Xtalk.freq>=F1).*(Shape.Xtalk.freq<=Fh)*(1/300);
Shape.Xtalk.DistU = 0;cf/1000:cf;
Shape.Xtalk.DistP = CalcEnhancedGaussDistribution(Shape.Xtalk.DistU, cf); %P
Shape.Xtalk.CF_min=cf_min;
% define ingress noise target (RFI-Tones)
P_dBm =[-70;-50;-60;-60;-40;-60;-60;-40;-70;-40];           % dBm @ 135 ohm
P=(10).^(P_dBm/10)*1E-3;
Shape.Ingress.ToneU =sqrt(P*135);                           % U=sqrt(P*R); effective value
Shape.Ingress.ToneF =[99;207;333;387;531;603;711;801;909;981]*1E3;
Shape.Ingress.ModDepth = 0.32*ones(10,1);%=mod index > 0.8, at CF>2.5 )
Shape.Ingress.ModWidth = 2*4.5E3*ones(10,1);                %= -10 kHz .. +10 kHz)
%----------------------------------------------------------------------------------
function [U,t] = CreateNoiseCont(Shape);
%----------------------------------------------------------------------------------
% create a noise voltage U(t), with predefined frequency domain characteristics
% (spectrum), but with uncontrolled time domain characteristics (distribution)
N = Shape.N;                            % number of samples, to be generated
%U = rand(N,1);                         % Uniform distributed white noise
U = randn(N,1);                         % Gaussian distributed white noise
U = FrequencyShape(U,Shape);            % shaped noise
t=[0:N-1]' * Shape.dT;                  % associated time axis
%----------------------------------------------------------------------------------
function [U,t]= CreateNoiseDiscr_Fast(Shape);
%----------------------------------------------------------------------------------
% Create a voltage U(t), with AM modulated carriers (RFI Tones); each having an
% individual predefined frequency, amplitude, modulation width and modulation depth.
% The random phase of the lower side band of each carrier tone is mirrored to
% convert arbitrary QAM modulation into (no mirroring) into the more restricted
% AM modulation (full mirroring)
% Mark that X refers in this algorithm to the components of  the Fourier series
% of the (near harmonic) ingress noise signal , while it refers to the
% spectral density in case of the (pseudo random) crosstalk noise signal
%
% Calculation time increases about linear with the number of samples
% About 80% of all calculation time is caused by the inverse Fourier transform
%----------------------------------------------------------------------------------
N = Shape.N;                                    % number of samples
m = Shape.m;                                    % half this number
Nc= round(Shape.Ingress.ToneF/Shape.dF)+1;      % index of carrier freq (pos only)
Nm=round(Shape.Ingress.ModWidth/Shape.dF/2);    % number of modulation
                                                % components Xc=0.5*Shape.Ingress.ToneU;                     % amplitude of carrier amplitude
Xm=Shape.Ingress.ModDepth.*Xc/sqrt(2*Nm);       % amplitude of modulation band
X=zeros(N,1);                                   % initialization
Xc=Xc.*exp(j*1000*rand(size(Xc)));              % random carrier phase
Xcc=(Xc.*Xc)./abs(Xc.*Xc);
for k=1:length(Nc)                              % for all modulated carriers, do:
    Nmp=Nc(k)+[1:Nm(k)]';                       % locate upper side band
                                                % frequencies
    Nmn=Nc(k)-[1:Nm(k)]';                       % locate upper side band
                                                % frequencies
    Xmp=Xm(k).*exp(j*1000*rand(size(Nmp)));     % create upper side band
    Xmn=conj(Xmp)*Xcc(k);                       % mirror lower side band
```

```
    X(Nmp)=Xmp;                                    % insert upper side band
    X(Nmn)=Xmn;                                    % insert lower side band
end;
X(Nc)=Xc;                                          % insert all carriers
X(N:-:m+2)=conj(X(2:ceil(m)));                     % Append spectrum
                                                   % (negative freq.)
%U= real(ifft(X))*N;                               % Transform to time-domain
U = real(fft(X));                                  % Transform to time-domain
                                                   % (10% faster)
t = Shape.dT*[0:N-1]';                             % associated time axis
%----------------------------------------------------------------------------
function [U,t] = CreateNoiseDiscr_Slow(Shape);
%----------------------------------------------------------------------------
% Create a voltage U(t), with RFI Tones at predefined frequency, amplitude
% and modulation bandwidth and modulation depth
% This algorithm is straight-forward, very inefficient, and for demo purposes only
% It can prove that CreateNoiseDiscr_Fast returns the same results
%----------------------------------------------------------------------------
N = Shape.N;                                       % number of samples, to be generated
m = Shape.m;
f=[0:N-1]' * Shape.dF;
t=[0:N-1]' * Shape.dT;
Fc=Shape.Ingress.ToneF;                            % list of carrier frequencies
Fc=Shape.dF * round(Fc/Shape.dF);                  % force an integer number of periods
%
U=0;
for k=1:length(Shape.Ingress.ToneF);
    % -- create noisy modulate, having U_avg=0 and U_rms=1.
    Nm =round(Shape.Ingress.ModWidth(k)/Shape.dF/2);
    Xn0=([1:N]<=(Nm+1))';                          % shape modulation noise amplitude
    Xn =Xn0.*exp(j*1000*rand(N,1));                % shape modulation noise phase
    Xn(1)= 0;                                      % Eliminate DC component.
    Xn(N:-1:m+2)=conj(Xn(2:ceil(m)));              % Append spectrum (negative freq.)
    Noise = real(ifft(Xn));                        % Transform to time-domain
    Noise=Noise/sqrt(sum(Noise.*Noise)/N);         % force rms=1
    % -- perform modulation
    Carrier = Shape.Ingress.ToneU(k)    * cos(2*pi*Fc(k)*t+1000*rand);
    Modulate = Shape.Ingress.ModDepth(k) * Noise;
    U = U + Carrier .* (1 + Modulate);
end;
%----------------------------------------------------------------------------
function [U] = FrequencyShape(U,Shape)
%----------------------------------------------------------------------------
% Reshape the spectrum of the sample U, as specified by the target shape
% INPUT:
%     U:              the consecutive values of the sample
%     fs:             the sample frequency
%     spectrum:       the desired PSD (in V/sqrt(Hz))
%----------------------------------------------------------------------------
N = length(U);
m = length(Shape.Xtalk.spec);                      % m=N/2
t= [0:N-1]'*Shape.dT;
% perform the frequency scaling
Scaling = Shape.Xtalk.spec ./ CalcSpec(U,t);
X = fft(U);                                        % Transform to frequency domain
X(1) = 0;                                          % Eliminate DC component.
X(2:m+1) = X(2:m+1) .* Scaling;                    % Scale spectrum (positive freq.)
X(N:-1:m+2)=conj(X(2:ceil(m)));                    % Append spectrum (negative freq.)
U = real(ifft(X));                                 % Transform to time-domain
%----------------------------------------------------------------------------
function [U] = AmplitudeShape(U,Shape)
%----------------------------------------------------------------------------
% This function shapes the amplitude distribution of the function U
% by an amplitude dependent (non-linear) distortion function Q(x).
% The result is U(t) = Q{U(t)}
%
% Let FF be the actual cumulative distribution function of the sample, and
% let GG be the desired cumulative distribution function,
% then the distortion function is given by:
%        Q(x) = GG^{-1} FF (x)
%----------------------------------------------------------------------------
U0=sqrt(sum(U.*U)/length(U));                      %scaling farct (for normalization)
% Calculate the distortion function Q
[DistP1,DistU1] = CalcCumDistrib(U/U0);            % the actual distribution
Q = interp1(Shape.Xtalk.DistP, Shape.Xtalk.DistU, DistP1);   % the distortion function
```

-continued

```
U = U0 *interp1(DistU1,Q,abs(U/U0)) .* sign(U);            % Perform the distortion
% plot(DistU1,Q); shg; %pause
%--------------------------------------------------------------------------------------------
function [X,f] = CalcSpec(U,t);
%--------------------------------------------------------------------------------------------
% calculate the spectral density of a signal, when it would be 'measured'
% at specified resolution bandwidth
RBW=1E3;                                     % RBW: the desired resolution for the spectrum of U
N = length(U); m=N/2;
dT = t(2)−t(1);                              % time spacing
dF = 1/dT/N;                                 % frequency spacing
f = [0:m−1]*dF;                              % all positive frequencies
X = fft(U)*dT;                               % to frequency domain
X = abs(X(2:m+1));                           % No DC and no negative frequencies.
X = sqrt(CalcSmooth(X.*X, f, RBW));          % average it over bandwidth RBW
%--------------------------------------------------------------------------------------------
function [X,f] = CalcNBSV(U,t);
%--------------------------------------------------------------------------------------------
% calculate the narrow band signal voltage of a signal, when it would be 'measured'
% at specified resolution bandwidth
RBW=1E3;                     %RBW:    the desired resolution for the spectrum of U
N = length(U); m=N/2;
dT = t(2)−t(1);                              % time spacing
dF = 1/dT/N;                                 % frequency spacing
f = [0:m−1]*dF;                              % all positive frequencies
%X = fft(U)*dT * sqrt(dF);                   % to frequency domain
%X = fft(U)/N;                               % to frequency domain
X = fft(U)/N*2;                              % to frequency domain
X = abs(X(2:m+1));                           % No DC and no negative frequencies.
%X = sqrt(CalcSmooth(X.*X, f, RBW));         % average it over bandwidth RBW
%--------------------------------------------------------------------------------------------
function [CF] = CalcCrest(U)
%--------------------------------------------------------------------------------------------
% Calculate the Crest Factor of a signal (U(t), which is the peak value
% divided by the rms-value
Urms = sqrt(sum(U.^2)/length(U));
Upeak = max(abs(U));
CF = Upeak/Urms;
%--------------------------------------------------------------------------------------------
function [F]=CalcEnhancedGaussDistribution(x,Cf);
%--------------------------------------------------------------------------------------------
% Generate a Cumulative distribution function F(x) that is identified as
% "enhanced gaussian distribution"
% Cf = crest factor
Alpha = 1e−3;
Sigma = sqrt( (1+Alpha) − Cf^2 * Alpha/3);
x = x .* (x>0) .* ( x<Cf) + Cf* (x>=Cf);
denominator = Alpha + erf(Cf/(sqrt(2)*Sigma));
F = 1 − (Alpha * x/Cf + erf(x/(sqrt(2)*Sigma)))/denominator;
%--------------------------------------------------------------------------------------------
function [DistP, DistU,P] = CalcDistrib(U)
%--------------------------------------------------------------------------------------------
% calculate the amplitude distribution of signal U
N = length(U);
Nbins=100;
[cumbin,xx] =hist(U,Nbins);
dX=xx(3)−xx(2);
DistP = cumbin(:)/N/dX;                      % force sum(DistP)*dX
DistU = xx(:);
Urms=sqrt(sum(U.*U)/N);
P=exp(−0.5*(DistU/Urms).^2); P=P/sum(P)/dX;
DistU=[DistU,DistU];
DistP=[DistP,P];
%--------------------------------------------------------------------------------------------
function [DistP, DistU] = CalcCumDistrib(U)
%--------------------------------------------------------------------------------------------
% calculate the (backward) cumulative amplitude distribution of signal U
len = length(U);
Ueff = sqrt(sum(U .* U)/length(U));
U = abs(U/Ueff);
% --- evaluate distribution function
Nbins = min([50,floor(len/10)]);
[cumbin,xx] = hist(U,Nbins);
BinWidth=xx(2) − xx(1);
DistU = xx − BinWidth/2; % shift
for n = [Nbins−1:−1:1];    cumbin(n) = cumbin(n) + cumbin(n+1); end
DistP = cumbin/len;
% --- improve numerical stability for other routines, when they use this result
DistU = [ 0 , DistU(2:end)];                 % start at x = 0
DistP = [DistP, 1/len];
```

```
DistU = [DistU,xx(Nbins) + 0.999 * BinWidth/2];        % add final (single) point
DistP = [DistP, 1e-100];
DistU = [DistU,xx(Nbins) + (1.001) * BinWidth/2];      % factor 1.001 for stability
%------------------------------------------------------------------------------------
function [PSD,freq]=CalcSmooth(PSD,freq,RBW)
%------------------------------------------------------------------------------------
% Imitate a real Spectrum Analyzer, with finite resolution bandwidth, and
% Gaussian shaped band filters
%         PSD = "power spectral density" which is de square of the "spectral density"; in
%               Volts per square Hertz.
%------------------------------------------------------------------------------------
N = length(PSD);
df = freq(2)-freq(1);
br = 3 * floor(RBW/df);
factor = 2*br + 1;
if (factor > 1)
..ff = df * (-br:br);                                  % smooth interval
..mask = exp(-ff.*ff/(2*RBW^2));
..mask = mask/sum(mask);                               % Gaussian mask of resolution band filter
..xhelp = [PSD;zeros(2*br,1)];
   lp = filter(mask,1,xhulp);                          % smart convolution
PSD = yhelp(br+1:end-br);
end;
%------------------------------------------------------------------------------------
function [Uac,Uac_rms]=CalcDemodulation(U,t,Shape,ToneNr);
%------------------------------------------------------------------------------------
% Demodulate the noise that has been modulated on the carriers of the discrete
% noise, it is for demonstration purposes only to prove that the
% discrete noise meets the predefined parameters.
%
% The demodulator uses synchronous detection, that is not locked in phase
% The consequence is an unknown attenuation over the full demodulation band.
% This is corrected afterward by measuring the DC level, and amplify the
% demodulated signal until this DC level has been normalized to 1 Volt
%
% PROOF: (psi is unknown)
% let    Urf=cos(w*t+psi)*(1+Uac);                     % = carrier modulated with "1+Uac"
%        Uc =cos(w*t);                                 % = carrier
%        Ud =Urf*Uc;                                   % = synchronous detected signal
%
% then Ud=1/2*(cos(psi+2*w*t)+cos(psi))*(1+Uac);
%        Ulf=cos(psi)/2*(1+Uac);                       % after low-pas filtering
%        Udc=cos(psi)/2;                               %= by averaging Ulf
%        Uac=(Ulf/Udc)-1;
%------------------------------------------------------------------------------------
N=Shape.N;
Fc=Shape.Ingress.ToneF(ToneNr);                        %select carrier frequency
Fc=Shape.dF * round(Fc/Shape.dF);                      %force an integer number of periods
ModWidth=Shape.Ingress.ModWidth(ToneNr);
ModDepth=Shape.Ingress.ModDepth(ToneNr);
%
Ud=U.*cos(2*pi*Fc*t);                                  % synchronous detection of modulated carrier
Nm=round(1.1*ModWidth/Shape.dF/2);                     % calculate filter frequency
mask=zeros(N,1); mask([1:Nm, N-Nm:N])=1;   % create filter
Ulf=real(ifft(fft(Ud).*mask));                         % perform low-pass filtering
Udc=sum(Ulf)/N;                                        % find not normalized DC level
Uac=Ulf/Udc-1;                                         % normalize overall level, and remove DC.
%
Uac_rms=sqrt(sum(Uac.*Uac/N));                         % must be equal to ModDepth, since Udc=1
Scale=Uac_rms/ModDepth;                                % must be "one"
```

The invention claimed is:

1. A device for testing a communication system, the device comprising:
   a processor;
   memory accessible by the processor;
   an impairment generator communicatively connected with the processor, and configured to be communicatively coupled with the communication system by way of a communicative coupling; and
   computer-readable instructions stored in the memory and executable by the processor to cause the impairment generator to:
   represent a test signal comprising a plurality of frequency components each having spectral amplitude properties and spectral phase properties,
   process the represented test signal to yield a processed test signal by setting the spectral amplitude properties in accordance with a defined envelope of spectral amplitudes, and arranging the spectral phase properties in accordance with random phase properties,
   apply an amplitude distortion function to the processed test signal to yield a distorted test signal,
   frequency shape the distorted test signal to yield an output test signal, and
   inject the output test signal into the communication system via the communicative coupling.

2. The device of claim 1, wherein the computer-readable instructions are executable by the processor to cause the impairment generator to represent the test signal by causing the impairment generator to represent the test signal as a set of numbers that specify a spectral amplitude and a phase of each of the frequency components.

3. The device of claim 1, wherein the computer-readable instructions are executable by the processor to cause the impairment generator to represent the test signal by causing the impairment generator to represent the test signal as a set of complex numbers, each complex number having a real part and an imaginary part, and wherein each real part and imaginary part in combination specifies a spectral amplitude and a phase of each of the frequency components.

4. The device of claim 1, wherein the computer-readable instructions are executable by the processor to cause the impairment generator to represent the test signal by causing the impairment generator represent the test signal as a first set of numbers that each specify an amplitude of the test signal in the time domain.

5. The device of claim 4, wherein the computer-readable instructions are further executable by the processor to cause the impairment generator to transform the first set of numbers from the time domain into the frequency domain for representing the test signal as a second set of numbers that specify a spectral amplitude and a phase of each of frequency components.

6. The device of claim 4, wherein the computer-readable instructions are further executable by the processor to cause the impairment generator to transform the first set of numbers from the time domain into the frequency domain for representing the test signal as a second set of complex numbers, each complex number having a real part and an imaginary part, and wherein each real part and imaginary part in combination specifies a spectral amplitude and a phase of each of the frequency components.

7. The device of claim 1, wherein the computer-readable instructions are further executable by the processor to cause the impairment generator to transform the processed test signal from the frequency domain into the time domain.

8. The device of claim 7, wherein the transformed processed test signal is represented by a set of numbers in the time domain.

9. The device of claim 1, wherein the computer-readable instructions are further executable by the processor to cause the impairment generator to:

arrange the processed test signal in accordance with a predefined time domain amplitude distribution by way of an iteration process that approaches the time domain amplitude distribution, and wherein the iteration process comprises a comparison of the time domain amplitude distribution of the processed test signal with a predefined time domain amplitude distribution.

10. The device of claim 1, wherein the computer-readable instructions are further executable by the processor to cause the impairment generator to:

arrange the processed test signal in accordance with a predefined envelope of spectral amplitudes by way of an iteration process that approaches the envelope of spectral amplitudes, and wherein the iteration process comprises a comparison of the envelope of spectral amplitudes of the processed test signal with a predefined envelope of spectral amplitudes.

11. The device of claim 1, wherein the output test signal is a noise signal.

12. The device of claim 1, wherein the computer-readable instructions are executable by the processor to cause the impairment generator to (i) apply the amplitude distortion function to the processed test signal and (ii) frequency shape the distorted test signal by causing the impairment generator to carry out an iteration process by which a test of a shape of an amplitude distribution of the output test signal is made to satisfy an amplitude distribution requirement.

13. The device of claim 12, wherein the iteration process comprises iteratively checking the output test signal against a crest factor requirement until the output test signal satisfies the crest factor requirement.

14. A tangible computer-readable medium having instructions stored thereon that, upon execution by a processor configured to be communicatively connected with an impairment generator device, cause the impairment generator device to carry out the functions of:

representing a test signal comprising a plurality of frequency components each having spectral amplitude properties and spectral phase properties;

processing the represented test signal to yield a processed test signal by setting the spectral amplitude properties in accordance with a defined envelope of spectral amplitudes, and arranging the spectral phase properties in accordance with random phase properties;

applying an amplitude distortion function to the processed test signal to yield a distorted test signal;

frequency shaping the distorted test signal to yield an output test signal; and injecting the output test signal into a communication system to which the impairment device is configured to be communicatively coupled.

15. The tangible computer readable medium of claim 14, wherein representing the test signal comprises representing the test signal as a first set of numbers that each specify an amplitude of the test signal in the time domain, and wherein the instructions, upon execution by the processor, cause the impairment generator to further carry out the function of:

transforming the first set of numbers from the time domain into the frequency domain for representing the test signal as a second set of numbers that specify a spectral amplitude and a phase of each of frequency components.

16. The tangible computer readable medium of claim 14, wherein representing the test signal comprises representing the test signal as a first set of numbers that each specify an amplitude of the test signal in the time domain, and wherein the instructions, upon execution by the processor, cause the impairment generator to further carry out the function of:

transforming the first set of numbers from the time domain into the frequency domain for representing the test signal as a second set of complex numbers, each complex number having a real part and an imaginary part, wherein each real part and imaginary part in combination specifies a spectral amplitude and a phase of each of the frequency components.

17. The tangible computer readable medium of claim 14, wherein the instructions, upon execution by the processor, cause the impairment generator to further carry out the function of transforming the processed test signal from the frequency domain into the time domain.

18. The tangible computer readable medium of claim 14, wherein the instructions, upon execution by the processor, cause the impairment generator to further carry out the function of:

arranging the processed test signal in accordance with a predefined time domain amplitude distribution by way of an iteration process that approaches the time domain amplitude distribution, and wherein the iteration process comprises a comparison of the time domain amplitude distribution of the processed test signal with a predefined time domain amplitude distribution.

19. The tangible computer readable medium of claim 14, wherein the instructions, upon execution by the processor, cause the impairment generator to further carry out the function of:

arranging the processed test signal in accordance with a predefined envelope of spectral amplitudes by way of an iteration process that approaches the envelope of spectral amplitudes, and wherein the iteration process comprises a comparison of the envelope of spectral amplitudes of the processed test signal with a predefined envelope of spectral amplitudes.

20. The tangible computer readable medium of claim 14, wherein (i) applying the amplitude distortion function to the processed test signal together with (ii) frequency shaping the distorted test signal comprise carrying out an iteration process by which a test of a shape of an amplitude distribution of the output test signal is made to satisfy an amplitude distribution requirement.

21. The tangible computer readable medium of claim 20, wherein the iteration process comprises iteratively checking the output test signal against a crest factor requirement until the output test signal satisfies the crest factor requirement.

* * * * *